United States Patent [19]

Heidemeyer et al.

[11] 4,331,226
[45] May 25, 1982

[54] DEVICE FOR AUTOMATIC ACTUATION OF AN AUTOMOBILE CLUTCH

[75] Inventors: Paulus Heidemeyer, Wolfsburg; Frank Zimmermann, Braunschweig; Romanus Scholz, Wolfsburg, all of Fed. Rep. of Germany

[73] Assignee: Volkswagenwerk Aktiengesellschaft, Wolfsburg, Fed. Rep. of Germany

[21] Appl. No.: 165,687

[22] Filed: Jul. 3, 1980

[30] Foreign Application Priority Data

May 7, 1979 [DE] Fed. Rep. of Germany ....... 2927175

[51] Int. Cl.³ ............................................ B60K 41/02
[52] U.S. Cl. .............................. 192/0.076; 192/0.096; 192/103 F
[58] Field of Search ............... 192/0.033, 0.076, 0.096, 192/103 R, 3.59, 3.58, 3.57, 103 F; 74/866

[56] References Cited

U.S. PATENT DOCUMENTS

| | | | |
|---|---|---|---|
| 3,752,284 | 8/1973 | Brittain et al. | 192/103 F |
| 4,019,614 | 4/1977 | Prenzel et al. | 192/3.58 X |
| 4,072,220 | 2/1978 | Hamada | 192/3.59 X |
| 4,224,842 | 9/1980 | Rabus et al. | 74/866 |
| 4,263,997 | 4/1981 | Poore | 193/0.033 |
| 4,281,751 | 8/1981 | Suga et al. | 192/3.59 |
| 4,295,551 | 10/1981 | Zimmerman et al. | 192/3.58 X |

*Primary Examiner*—George H. Krizmanich

*Attorney, Agent, or Firm*—Brumbaugh, Graves, Donohue & Raymond

[57] ABSTRACT

Apparatus for automatic actuation of a clutch of an automobile with a manual shift transmission. A pneumatic servo motor controls clutch engagement. A control mechanism, for example a microprocessor, controls the servo motor as a function of accelerator pedal position and/or input and output clutch speeds during starts from stop (initial transmission input speed ≃O). The rotation speed of the engine attains a prescribed value preassigned as a function of the accelerator pedal position. For each pedal position, signals to control valves cause the servo motor to vary clutch engagement based on the difference between prescribed and detected engine speeds. The signals can be pulse signals variable in frequency and/or duration by the control mechanism. During starting from stop, for pedal depressions above idle, the rotational speed of the engine remains below maximum tractive power for that pedal position. In a range of pedal positions approaching maximum depression, in one embodiment, the engine speed increases discretely to the maximum tractive power figure at or near maximum depression. In another embodiment the discrete speed increase to the maximum tractive power speed occurs before maximum pedal depression. As the pedal approaches maximum depression, a threshold of increased resisting force occurs. Air pressure variation can be detected, electrically indicated, and that variable employed to modify prescribed engine speed.

9 Claims, 4 Drawing Figures

STARTING PROGRAM

DEVICE FOR AUTOMATIC ACTUATION OF AN AUTOMOBILE CLUTCH

BACKGROUND OF THE INVENTION

This invention relates to a device for automatic actuation of an automobile clutch for connecting and disconnecting the automobile engine with a manual shift transmission. More particularly, the invention relates to a clutch actuation arrangement having a clutch actuating servo motor operated by auxiliary power (pneumatic for example) and having a control mechanism or means for controlling the servo motor as a function of the position of the accelerator pedal and/or the speeds measured at the input to the clutch (engine speed) and at the output of the clutch (transmission input speed).

The invention is an improvement in the Automatic Clutch System of U.S. patent application Ser. No. 061,059 of Zimmermann et al., filed July 26, 1979, now U.S. Pat. No. 4,295,551 and commonly owned. The disclosure of that application is incorporated herein by reference. That application discloses apparatus for automatic actuation of an automobile clutch by means of a servo motor that is actuated by auxiliary power, whereby, during starting, the auxiliary power delivery to the servo motor is controlled so that the rotational speed of the engine remains within a preassigned range about a preassigned rotational speed that is variable as a function of the position of the accelerator pedal. In that application, the preassigned value of the rotational speed of the engine follows a curve of maximum tractive power. That is to say, the preassigned rotational engine speed in each accelerator pedal position corresponds to the engine speed which gives maximum engine torque associated with that particular position of the pedal. However, maintaining the rotational speed in the range that extends above and below the optimum speed for each pedal position necessitates relatively heavy useage of the clutch, with considerable heat generation and corresponding wear. It also leads to relatively high noise levels, and increases fuel consumption, particularly in starting from a stop.

BRIEF SUMMARY OF THE INVENTION

It is an object of the invention to improve the clutch operating apparatus of the aforesaid application to avoid the above shortcomings.

It is a further object of the invention to improve the invention according to the above-mentioned application in that area designated in that application as the first mode of operation, starting from stop (initial transmission speed $\simeq 0$), by overcoming the shortcomings described above. This improvement is made by maintaining engine speed at less than maximum tractive power throughout a range of accelerator pedal depressions or throttle openings. A control mechanism or means that may include a microprocessor controls the application of auxiliary power (pneumatic power in the preferred embodiment that is described) to a clutch-controlling servo motor so that rotational speed of the engine attains a prescribed rotational speed preassigned as a function of the position of the accelerator pedal or throttle valve. This prescribed speed is less than the engine speed that gives maximum tractive power or maximum torque at that particular pedal or throttle position. This is true throughout a range of pedal depressions until pedal depression or throttle opening approaches or is at its maximum.

In accordance with one aspect of the invention, in a range of pedal actuations (or throttle openings) approaching maximum pedal depression, engine speed increases discretely (one or more jumps) to that speed corresponding to maximum tractive power, but otherwise, for a range of pedal positions above idle to near maximum, i.e., a range of relatively forceful pedal actuations, engine speed during starting from stop is kept at less than maximum tractive power as mentioned.

By this invention, then, there is initially provided a set of prescribed engine speeds that may be designated as the "starting curve", whereby speeds increase with pedal depression, but always to less than maximum tractive power, from above idle to near maximum pedal depression. As a result, clutch work is reduced and there is less heat generation and wear. At the same time, engine noise and fuel consumption are limited by virtue of the lower rotational speeds. However, to improve the upper limit of starting behavior, permitting, for example, high acceleration where that is needed, prescribed speed is abruptly increased to the speed giving maximum tractive power or torque at or proximate maximum accelerator pedal depression. This increase in engine speed, in other words, can take place along what is called the full load curve, the curve of maximum pedal actuation and, maximum throttle valve angle or opening, or it can occur, prior to attainment of the full load state, at a smaller throttle valve angle occurring at a smaller pedal depression. In either case, where switching to maximum tractive power occurs before or very near maximum pedal depression, the switching point may be associated with a threshold of additional accelerator force, that is, for example, by providing in addition to the spring and linkage resisting pedal depression, additional "spring stop", a means for increasing the force necessary for further pedal depression. This in its simplest form can be a spring engageable by the pedal directly or through connecting parts as the pedal approaches full depression. By this, the operating range in which engine speeds providing maximum torque or tractive power is achieved only after exertion of increased pedal force. This provides a "kickdown range" of increased pedal resistance that becomes associated in the driver's mind as preceding the switch over to higher engine speeds. Particularly where the switch over occurs at or very near maximum load, "free travel of the pedal" can also be provided, during which no or little increase in engine speed occurs until the point of the switch over to maximum tractive power.

By the immediately foregoing provisions, the driver receives additional information on the load condition, which is to say he is very well aware that he is selecting a maximum acceleration (high load) condition of engine operation by virtue of his having to overcome the additional force resisting depression of the pedal and, where a "free travel zone" is provided, by having to depress the pedal considerably before the change in operation occurs. He can thus better evaluate his driving intentions. For example, he should be perfectly aware that he is increasing his gas consumption. And in the case where the speed increase is abrupt and prior to the attainment of full engine load, e.g. full pedal depression, the point where increased pressure is required can offer the driver a preferred pedal position for continuous engine load for economic driving, avoiding that range of engine overload that the carburetor or other mixture forming device is capable of providing by for example full throttle valve opening.

If the vehicle is to start from stop at a high altitude, a rise in initial speed may also be helpful in diminishing the problem of decreased engine output that results from decreased air intake and increasing mixture overenrichment requiring, in turn, increased ignition advance (in the case of carburetor-equipped engines). To improve the operation at these high altitudes, a revised starting curve can be provided with increased rotational speed levels corresponding to the needs dictated by the engine design (mixture formation means, ignition timing curve, etc.). To this end, means can be provided to vary the curve of prescribed rotational speed ($n_1$ $_{soll\,(prescribed)}$) as a function of altitude, measured, for example, by an aneroid box type of altimeter or barometer, as is known in the art, with suitable electrical output.

A further inportant feature of this invention is the generation by the control means of a correcting signal controlling the auxiliary power delivery to the servo motor, the correcting signal being a function of the difference between the prescribed and actual values of engine speed. For this, the control means can be a suitably chosen microprocessor with the prescribed engine speed value for accelerator or throttle position stored and comparison means for comparing the detected engine speed with the stored, prescribed speed. The correcting signal or a characteristic thereof may increase linearly or progressively as the speed difference increases. In a preferred embodiment, the characteristic that increases is either the pulse duration or pulse frequency of time-spaced actuation pulses applied to control valves preceding and controlling the servo motor.

Whereas, in accordance with the disclosure of the above-mentioned patent application, fixed rotational speed limits were preassigned on either side of the prescribed rotational speed that triggered clutch adjustment to vary engine speed towards maximum tractive power speeds, in this invention speed regulation occurs more spontaneously without troublesome searching between the upper and lower speed limits. Here, as the difference between prescribed and actual rotational speed increases, the correcting variable, that characteristic of the correcting signal that modifies speed, increases as well and leads the engine toward the prescribed speed.

BRIEF DESCRIPTION OF THE DRAWINGS

The above and further advantages of the invention will better be understood with reference to the following detailed description of a preferred embodiment taken in connection with the attached drawings, wherein.

DESCRIPTION OF PREFERRED EMBODIMENT

Figure 1:
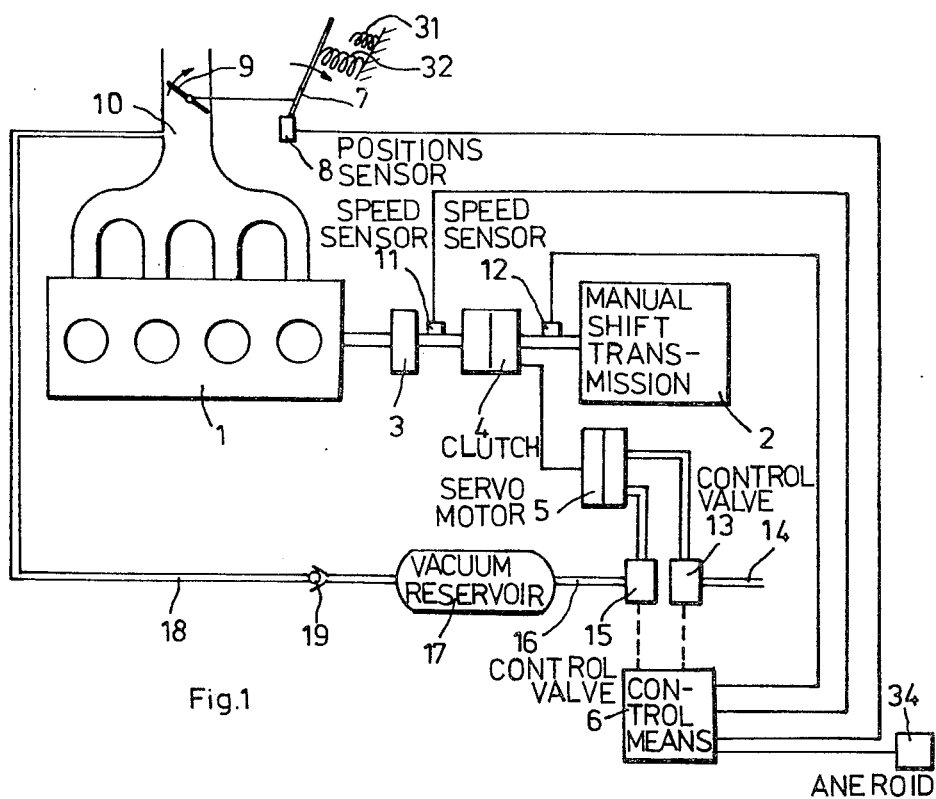
FIG. 1 is a schematic illustration in block diagram form of clutch control provisions according to the invention shown coupled between an engine output shaft and the input shaft of a manually operated transmission.

In FIG. 1, a conventional vehicle engine 1 is connected via a flywheel 3 and a clutch 4 with a manually operated transmission 2 that is adapted for the shifting of gears by hand. The clutch 4, however, is not actuated by means of a pedal in the customary fashion, but is engaged and disengaged by means of a servo motor 5. The servo motor 5 is controlled by auxiliary power. In this case, the auxiliary power is pneumatic, the servo motor being a pneumatic vacuum activated servo motor known in the art. To control the servo motor 5, two control valves 13 and 15 are connected thereto. These are responsive to control signals of a control mechanism or control means 6 that may include a microprocessor. The valves 13 and 15 connect the interior of the servo motor 5 either with a line 14 carrying atmospheric pressure, or with a vacuum line 16 connected with a vacuum reservoir 17. In the case of the engine illustrated in FIG. 1, which is equipped with a carburetor as the mixture forming means, a vacuum line 18 may connect the vacuum reservoir to the intake manifold between the throttle valve 9 and the block of the engine 1. Interposed in the line 18 between the vacuum reservoir 17 and manifold 10, a check valve 19 prevents vacuum loss from the reservoir 17 in the event the manifold pressures increases above the pressure of the reservoir 17.

In all of the provisions just described, the system is like that described in the above-identified copending application. Additional details not pertinent to the improvement according to this invention are shown therein.

The control means 6 delivers its control signals to the valves 13 and 15 to control pressure delivery to the servo motor 5 as a function of the position of an accelerator pedal 7 that actuates a throttle valve 9. To this end, the accelerator pedal 7 is equipped with a sensor 8 that detects the position of the pedal and provides an electrical indication of the position thereof to the control means 6. Alternatively, the pedal position sensor 8 could be replaced by a like sensor detecting throttle valve angle in the case of the carburetor equipped engine with ordinary angularly adjustable throttle valve controlling the throttle opening. But for the purpose of this exemplary embodiment, the reference shall be made to detection of the pedal position. The control means 6, moreover, receives information on the speed of a shaft into the clutch, which is engine speed, and out of the clutch, which is transmission input speed. Electrical indications of these speeds are provided by the speed sensors 11 and 12, respectively.

In the following discussion of the functioning and effect of the automatic clutch actuation apparatus, only the operation of the apparatus during starts from stop are discussed inasmuch as the present invention resides in improvements in that operation. As for the remaining operation of the system, the above-identified copending application describes in detail the operation of the apparatus in those areas unaffected by the present invention. By the terms "starts from stop", or "starting from stop", is meant that process wherein the clutch is engaged, with the engine running and the vehicle at or near a dead stop, for the purpose of starting movement of the vehicle. Selection between starting and shifting modes can be made in the manner described in the above mentioned application or in any of a number of ways. For example, the starting mode can be selected by use of the zero or near zero speed indication of the sensor 12 and/or other relevant indications to address that section of the memory of the microprocessor 61 of FIG. 1B that contains the prerecorded prescribed engine speeds throughout the accelerator pedal positions from idle to maximum depression.

At the starting process, clutch engagement is controlled pursuant to this invention in that the engine speed is brought to the predetermined prescribed speed which is variable as a function of pedal position and respectively, of course, throttle condition. This is accomplished step-by-step, as the accelerator pedal is pressed, by a succession of spaced pulses applied as control signals from the control means 6 to one or the other of the control valves 13 and 15. The train of pulses is varied in duration or frequency to vary the application of a vacuum to the servo motor by the valve 15 or to vary the ventilation of the servo motor by the valve 13. Variation of the duration or frequency of the output pulse to the control valves can be accomplished as a function of the difference between the actual engine speed ($N_1$) and the prescribed engine speed by, for example, the pulse output of the microprocessor 61 containing comparison means to compare the input from the sensor 11 indicating actual motor speed and another input from the memory 62 indicating the stored prescribed engine speed. Other inputs to the microprocessor come from sensor 12 indicating the transmission input speed, from the aneroid barometer 34 and from sensor 8 via an analog to digital converter 63 that converts the analogously measured pedal position to a digital signal readily operated in the microprocessor 61. The outputs of the amplifiers 64a and 64b are the correction signals which are applied to the control valves 13 and 15.

Unlike the apparatus of the aforementioned application, the greater the difference or error, the greater the correction is that follows. From that portion of the memory previously addressed when the starting mode was selected, the predetermined value of prescribed engine speed to be given to the microprocessor 61 is selected (e.g. addressed) on the basis of the output of the sensor 8, that is to say, based on pedal position.

Figure 2:
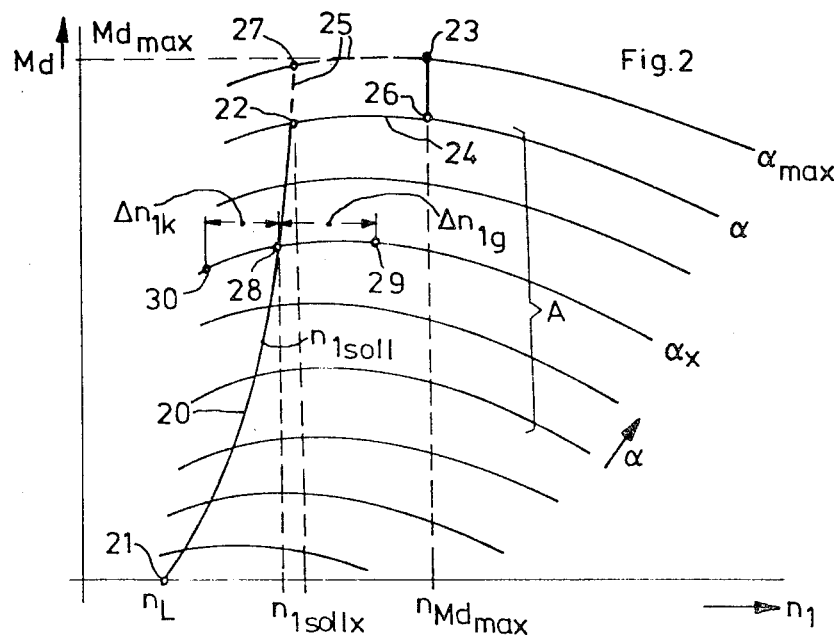
FIG. 2 is a plot of a prescribed engine speed curve for starting from stop according to the invention and is shown on a graph of engine performance plotted as engine load versus engine speed with throttle valve $\alpha$ entered as a parameter.

Starting with the idle speed $n_l$ in FIG. 2 clutch engagement is controlled to maintain engine speed at or near prescribed speeds below maximum tractive power or maximum torque for each throttle position. This is shown in FIG. 2 by the curve $n_1$ $soll$ $(prescr.)$. In FIG. 2, torque $M_d$ is plotted against engine speed $N_1$ for various throttle positions $\alpha$. As can be seen, the curve $n_1$ $soll$ $(prescr.)$ is less than the speed producing maximum torque, at least in those throttle positions in a range from above idle to just below maximum throttle opening $\alpha_{max}$, which corresponds to maximum pedal depression. This range, wherein the pedal is rather forcefully depressed, but not entirely depressed to its fullest extent, is indicated in FIG. 2 as the range A. Those curves designated $\alpha$ in FIG. 2 are the plots of torque versus engine speed for various fixed throttle angles $\alpha$. The prescribed speed plot $n_1$ $soll$ $(prescr.)$ begins at point 21 which is the idle speed $n_L$ and continues along the curve 20 to the point 22. Throughout, the rotational speed of the engine increases constantly and gradually, but, at least in the range A, not to the speed that produces maximum torque. Alternatively, the gradual increase in engine speed plotted along the curve 20 in FIG. 2 can be replaced, if desired, by one or more and preferably at least four discrete increases or jumps. This, of course, requires the storing of far fewer prescribed speed values for comparison with the actual engine speed.

It is only in the proximity of full load (near $\alpha_{max}$) on the starting speed curve that the limit on starting speed behavior is raised. The prescribed engine speed is raised to at least approximately that speed producing maximum torque and maximum tractive power. That speed is shown at point 23 on the maximum throttle position curve $\alpha_{max}$ in FIG. 2 and is designated $n_{Mdmax}$. The increase to point 23 can be obtained in two ways. One is indicated by the full line 24 extending from the point 22 to the point 26 and then to 23. The other is indicated by the broken line 25 extending from point 22 to point 27 and then to 23. In the former case the speed increase is obtained prior to full throttle opening, which is the heaviest loaded condition of the engine, and occurs at full pedal depression. In the second case, however the speed increase is achieved only upon maximum throttle opening, which corresponds to full pedal depression and to maximum engine load.

In both of the cases discussed above, it may be useful to provide for a threshold of increased pressure required to further depress the accelerator pedal. This can be accomplished simply enough with the addition of an auxiliary spring stop 31 illustrated schematically in FIG. 1 in addition to the usual spring or pedal bias means 32. In addition, and particularly in connection with the case in which the increase to the engine speed of maximum torque occurs at full throttle position (line 25), an area of free travel of the pedal can be provided wherein little or no speed increase occurs until the abrupt or discrete change to full load speed. This, of course, can be accomplished by prescribing in the values of stored prescribed speeds little or no change in speed from the point of increased force to the change over point. The use of the auxiliary spring stop 31 or like means for increasing the pressure necessary to depress the pedal indicates to the driver the attainment and possibly the exceeding of that accelerator position corresponding to a substantial speed increase to maximum torque engine speed. The creation of this area of increased resistance or "kickdown zone" can lead to economic driving. By depressing the pedal directly to but not into the kickdown, a natural stopping point, starts from stop occur along the economic prescribed curve of engine speeds shown in FIG. 2 from 21 to 22, and without the additional enrichment of mixture, gas consumption, and clutch wear associated with maximum motor speed.

The affect of the control of the clutch in accordance with this invention will now be explained with the help of an example. Assume that when a vehicle equipped as described above is started, the accelerator pedal is despressed such that the throttle valve assumes the position indicated in FIG. 2 by $\alpha_x$. This position is associated with the prescribed rotational speed $n_1$ $soll$ $(prescribed)x$, which is point 28. Assume a state of complete disengagement of the clutch to begin with. The servo motor 5, through pulse actuation of the control valve 13 is acted on with atmospheric pressure for a limited time so that the clutch 4 is displaced in the engagement direction. Actuation can be accomplished by known actuating means in addition to the servo motor, for example ordinary means biasing the clutch towards engagement and against which the activated servo motor must act. The control valve 13 is actuated by the control means 6 such that the duration or frequency of the pulses as applied to the valve 13 bring about pulsed opening of the valve to accomplish this movement of the servo motor towards clutch engagement. The frequency or duration of pulses from the control means 6 is modified as a function of the magnitude of the speed difference between the actual value of the engine speed and the prescribed value as described. This correcting variable decreases as engine speed approaches prescribed speed, and of course increases, as the error or difference in the two speeds increases. This same applies to the actuation of the control valve 15, in the event that, at the beginning of the starting process, the engine speed should be smaller than the prescribed rotational speed. Thus, the control means 6 forms a signal representative of speed difference $\Delta n$, which, depending on whether the actual speed is larger or smaller than the prescribed speed, is used for the pulse actuation of the control valves 13 or 15.

In FIG. 2, the speed difference is indicated by $\Delta n_{1g}$ (point 29) for the case in which the engine speed, during the starting process, is larger than the prescribed speed. In the event that the engine speed is smaller than the prescribed speed, the corresponding speed difference is indicated by $\Delta n_{1k}$ (point 30).

Figure 1A:
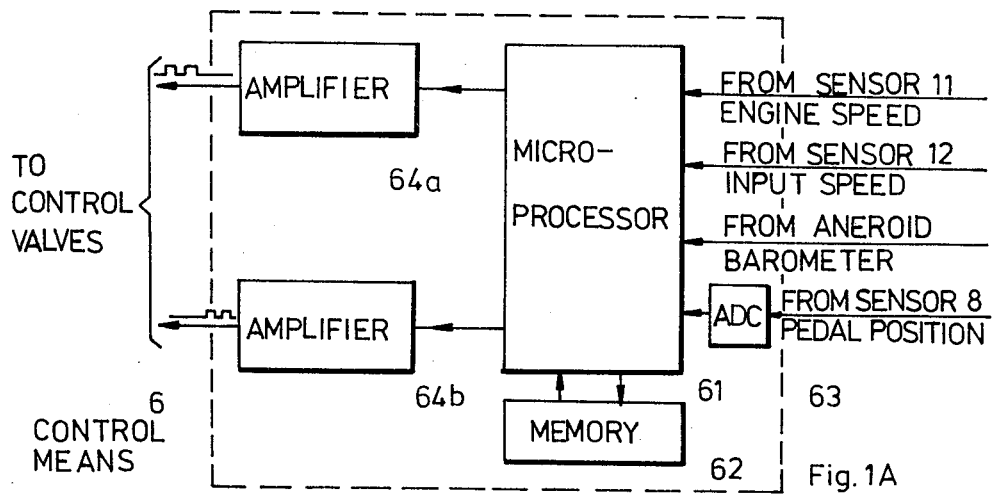
FIG. 1A is a further schematic illustration in block diagram form showing in greater detail the provisions of a suitable control means for controlling a clutch actuating servo motor based on indications of accelerator pedal position, engine speed, and clutch output speed.
Figure 1B:
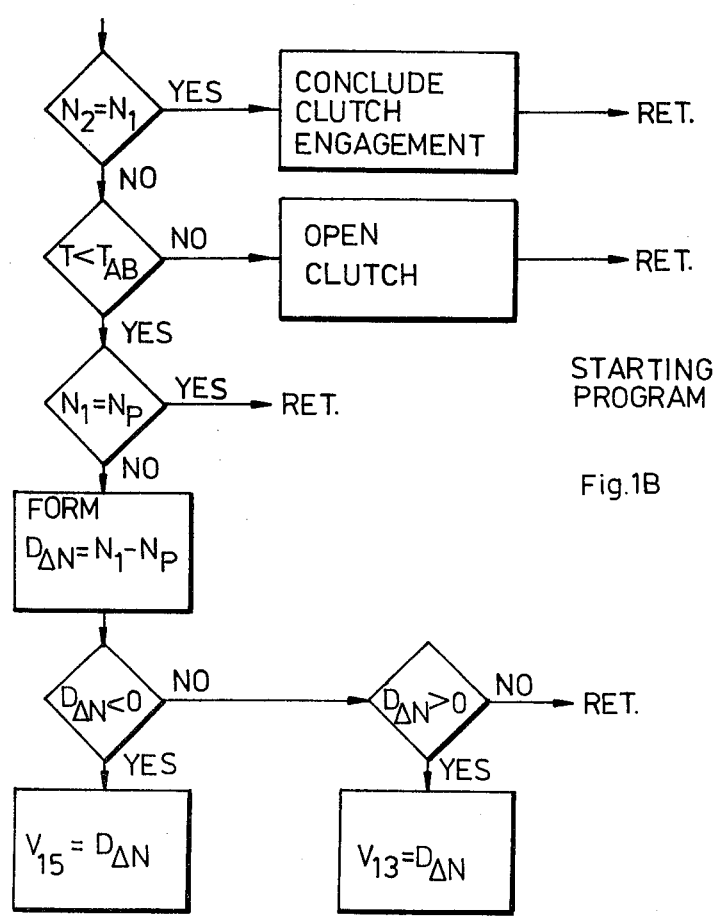
FIG. 1B is a flow diagram of a program subroutine for the starting from stop clutch actuation mode of this invention.

In FIG. 1B a flow diagram represents a control program subroutine for use in the microprocessor 61 for starting from stop in the manner just described.

The main program, the selection of the subroutine for starting or for shifting and initialization subroutines, etc. can be as described in the above copending application. They are not a part of this invention.

In the FIG. 1B the following symbols are used:

$N_1$ Engine speed (clutch input);
$N_2$ Clutch output speed;
T Time;
$T_{Ab}$ Time, dependent, e.g. upon the engine output, after which the starting program must be discontinued for reasons of safety, e.g., in order to prevent overheating of the clutch;
$N_p$ Prescribed value for engine speed per FIG. 2 (heretofore $N_1$ *soll (prescr.)*);
$D_{\Delta n}$ Difference between engine speed and prescribed speed;
$V_{13}$ The correction signal to control valve 13;
$V_{15}$ The correction signal to control valve 15.

At the start of the subroutine and throughout $N_1$ and $N_2$ are compared. The clutch is fully engaged and the subroutine is terminated when these speeds are equal. The time T that has transpired since the beginning of this clutch engagement subroutine is measured and if too long, the clutch is opened. Engine speed is compared with prescribed engine speed and if there is a difference an error $D_{\Delta n}$ is formulated. If the engine speed is higher than prescribed a valve control signal $V_{13}$ is formulated based on the speed difference, $D_{\Delta n}$. The signal controls valve 13. If the engine speed is lower than prescribed, an error signal $V_{15}$ is formulated based on $D_{\Delta n}$. The signal is used to control valve 15.

Actuation of the control valves in accordance with the invention by means of a controlled variable (pulse length or frequency), which is variable as a function of the magnitude of the speed difference avoids constant engagement and disengagement of the clutch between the speed limits forming the speed range on each side of the prescribed speed, as occurs with the method of the aforementioned copending application. By this invention, in ordinary starts, the engine speed is brought to the prescribed speed from one side. By virtue of this, the correcting variable formed by the pulse length or pulse frequency becomes smaller as engine speed approaches the starting curve, and the clutch actuation thereby is increasingly sensitive.

One other modification of the prescribed speeds is indicated in FIG. 1. An altimeter or aneroid barometer 34 increases prescribed speed as described above. This can be done in the embodiments of FIGS. 1, 1A, and 1B in any of a number of ways, by adding a constant to the stored values forming the prescribed speed curve or by addressing a new curve in the memory 62 of the microprocessor 61.

It should be mentioned here that the control pulse for actuation of the control valves need not necessarily be generated constantly, for example, when the clutch is completely engaged or completely disengaged. Rather it is entirely sufficient that such pulses be generated only when needed, i.e., only during the engagement and disengagement process proper. This results in reduced energy consumption, increased life span of the control valves, as well as a possible smaller dead time requirement.

In an alternative embodiment other than that illustrated in the drawing, but nevertheless embodying the inventive concepts herein, the servo motor 5 can also be actuated by the use of precontrol valves which are controlled electrically by the control means 6. These can operate at a lower level of energy and can have a smaller cross-section than the control valves 13 and 15 shown. Each precontrol valve can be used to actuate a further main control valve of larger cross-section, or the two precontrol valves can operated a single common main control valve, again of larger cross-section, which larger control valve or valves supply the auxiliary energy, e.g. the vacuum, that drives the servo motor. This further modification is preferable for electronic actuation by the control means 6 inasmuch as smaller and more economical pulse amplifiers, transducers, and other components with smaller current consumption and power demands can be employed. In addition, the associated smaller servo valves have shorter dead times in their switching process, a further consideration of importance for the control circuit's proper function.

As will be recognized by those skilled in the art, while in the embodiment described above, it was assumed that ventilation of the servo motor 5, i.e., connection with atmosphere, causes engagement of the clutch 4 and that disengagement is caused by evacuation, i.e., connection with the vacuum reservoir 17, a servo motor can be designed or selected such that disengagement of the clutch occurs with ventilation and engagement with air removal. Other obvious alterations of the particular preferred embodiments that do not depart from the spirit and scope of the invention will be apparent to those routinely skilled in the art. Therefore, the above-described preferred embodiments are not to be understood to limit the scope of the applicants' invention, the scope of which invention is set forth in the appended claims. In the claims, the term "speed adjusting means" is used to cover the accelerator pedal, the throttle valve, or other speed control arrangement.

We claim:

1. In apparatus for automatic actuation of an automobile clutch operatively located between an automobile engine and a manually shiftable transmission, of the kind that includes a servo motor responsive to auxiliary power applied thereto for effecting engagement and disengagement of the clutch, and control means for controlling the auxiliary power delivery to the servo motor as a function of the speed adjusting means or the clutch input and output rotational speeds or both, and wherein the control means controls the auxiliary power delivery to the servo motor during starting from stop (initial transmission input speed $\simeq 0$) so that the rotational speed of the engine attains a prescribed rotational speed which is a function of accelerator pedal position; the improvement comprising, in said control means, means operable in a range of speed adjusting means positions greater than idle for adjusting the auxiliary power to the servo motor to maintain values of engine speed, in a corresponding range of engine speeds greater than idling, at prescribed engine speeds below the maximum tractive power engine speed for each speed adjusting means position in the range, and means operative for speed adjusting means positions approaching maximum for increasing the rotational engine speed discretely to the rotational speed corresponding to maximum tractive power.

2. The apparatus according to claim 1, further including means for detecting outside air pressure and providing an indication thereof, and said control means further includes means responsive to said pressure indication for varying said prescribed engine speed as a function of indicated air pressure.

3. The apparatus according to claim 1, wherein the means for increasing rotational engine speed discretely includes means responsive to maximum accelerator pedal depression for effecting the discrete increase to a maximum tractive power speed when the accelerator pedal is fully depressed.

4. The apparatus according to claim 1, wherein the means for increasing rotational engine speed discretely includes means responsive to an accelerator pedal position less than fully depressed for effecting the discrete increase to a maximum tractive power speed prior to maximum accelerator pedal depression.

5. The apparatus according to claim 3 or 4 further including means operatively associated with the accelerator pedal for providing a force threshold of increased force necessary to continue depression of the accelerator pedal through said pedal positions approaching maximum depression.

6. The apparatus according to claim 5, wherein the means for providing a force threshold comprises an auxiliary spring stop associated with said accelerator pedal.

7. Apparatus according to any one of claims 1 through 4, wherein said control means comprises means responsive to the actual and prescribed rotational engine speeds for producing a correcting signal varying as a function of the difference between said speeds, and means responsive to said signal for varying the power delivered to the servo motor as a function of said difference in speeds.

8. The apparatus according to claim 7, wherein said correcting signal includes a characteristic increasing as the difference between said actual and prescribed rotational engine speeds increases.

9. Apparatus according to claim 7, wherein said correcting signal is a pulse signal, the control means for controlling the auxiliary power delivery to the servo motor includes control valves responsive to the pulse signal for pulse actuation of the servo motor and the clutch, and variations in the difference in speeds varies at least one of the pulse duration and frequency of the pulse signal to vary clutch engagement.

* * * * *

UNITED STATES PATENT AND TRADEMARK OFFICE
CERTIFICATE OF CORRECTION

PATENT NO. : 4,331,226

DATED : May 25, 1982

INVENTOR(S) : Heidemeyer et al.

It is certified that error appears in the above-identified patent and that said Letters Patent is hereby corrected as shown below:

Page 1, Item 30, Foreign Application Priority Data, "May 7, 1979" should read -- July 5, 1979 --.

Signed and Sealed this

Twenty-ninth Day of March 1983

[SEAL]

Attest:

GERALD J. MOSSINGHOFF

Attesting Officer

Commissioner of Patents and Trademarks